May 5, 1970

A. LEGER, JR 3,510,648

APPARATUS EMPLOYING ULTRAVIOLET RADIATION FOR MEASURING THE
AMOUNT OF FLUORESCENT MATERIAL IN A CONTINUOUSLY
FLOWING FLUID STREAM

Filed April 25, 1967

INVENTOR.
ALTON LEGER JR.

BY John Shaw Stevenson

AGENT.

INVENTOR.
ALTON LEGER JR.

BY
John Shan Stevenson

AGENT.

United States Patent Office 3,510,648
Patented May 5, 1970

3,510,648
APPARATUS EMPLOYING ULTRAVIOLET RADIATION FOR MEASURING THE AMOUNT OF FLUORESCENT MATERIAL IN A CONTINUOUSLY FLOWING FLUID STREAM
Alton Leger, Jr., Roslyn, Pa., assignor to Honeywell, Inc., Minneapolis, Minn., a corporation of Delaware
Filed Apr. 25, 1967, Ser. No. 633,575
Int. Cl. G01n 21/52
U.S. Cl. 250—43.5                     10 Claims

ABSTRACT OF THE DISCLOSURE

A measurement of the quantity of fluorescing material such as oil in a fluid is accomplished by directing ultraviolet energy at a fixed location through portions of a web of transparent nonfluorescent material into a narrow jet stream of the fluid and also into a stable reference fluorescent material employing photoelectric detectors to measure the visible light emitted from the fluid and the reference fluorescent material, employing an electric circuit to maintain the current output of the first mentioned photoelectric detector proportional to the amount of light it receives divided by the amount of light received by the other photoelectric detector and thereby provide a measuring circuit that is uneffected by errors due to changes in line voltage, aging, temperature, and spectral shifts which may take place in the ultraviolet energy source and changes that occur due to the temperature coefficient of the photoelectric conductors.

---

It is an object of the present invention to disclose an improvement in apparatus for measuring the amount of fluorescent material such as oil in water and other fluids.

It is another more specific object to provide a measuring apparatus that can be beneficially used to detect and accurately record minute amounts of crude oil, heavier petroleum products, and/or other fluorescent material in natural and process water or other fluids.

It is another object to disclose an apparatus that will direct a source of ultraviolet radiation through a first filter to absorb visible radiation and thence into a fluorescing reference glass, back through a second filter to remove ultraviolet and pass visible radiation to a reference photocell of a ratio measuring circuit while simultaneously directing another portion of the source of ultraviolet radiation on the fluid under measurement and detecting the amount of radiation in the visible spectrum range emitted by this fluid by means of a second photocell that forms a part of the ratio measuring circuit.

In order to minimize loss of the light signal due to undesired absorption and turbidity effects experienced with other presently available oil in fluorescing fluid detecting devices it is another object of the invention to provide a source of ultraviolet radiation and a photoconductive radiation detector for detecting light in the visible range at a location that is on the same side of a stream of this fluid in lieu of an opposite side of the stream and to reduce the width of the stream to one that is of a relatively thin jet form.

Still another object of the invention is to disclose a reliable explosion-proof oil detecting and measuring apparatus for use in industrial and marine environments which can be operated automatically over long periods of time without adjustment or maintenance.

It is another object of the invention to provide not only a window between the detector and the jet stream but also a nonfluorescent transparent tape, such as commercial Teflon, which is continuously moved between a supply and a take-up spool across the jet stream side of the glass window to prevent any oil film, dirt and other foreign matter that is cast out of the stream from adhering to the glass and obstructing the ultraviolet light being directed on the sample and the visible light signal emitted from the oil in the fluid stream which is being sensed by the detector.

It is another object of the present invention to disclose a low speed reel driving motor and clutch associated with the aforementioned tape carrying spools for continuously moving successive clean parts of the aforementioned transparent tape across the glass window and a high speed reel driving motor and clutch that will override the slow motion at which the low speed motor moves the tape between the supply and take-up spools so that a clean transparent piece of tape can be rapidly brought into contact with the glass window when an accumulation of particles on the glass is suspected.

It is another object of the present invention to employ a fluorescing glass in lieu of the stream of fluid to simulate a preselected oily stream of fluid when it is desired to make a calibration change in the apparatus or when it is desired to make a check on the optical and electronic parts of the apparatus.

When chemicals such as oil are dumped into a stream as waste products they invariably have the tendency to kill the animal, fish and/or vegetable life which in turn disrupts the bacteriological health of the stream and this causes the stream to become polluted.

In more recent years domestic and international laws have been written which prohibit process industries such as oil refineries and ships that use our streams, oceans and seas throughout the world from disposing harmful quantities of chemicals such as oil and/or fluorescent material into these waterways.

For the aforementioned reasons it is another object of the invention to provide an instrument that manufactures and captains of river or ocean going vessels can use to determine when quantities of fluorescent chemicals such as oil in a waste product to be disposed of into a river or ocean exceeds a level which would destroy the healthy bacterological life of that body of water.

A better understanding of the present invention may be had from the following detailed description when read in connection with the accompanying drawings in which.

Figure 1:
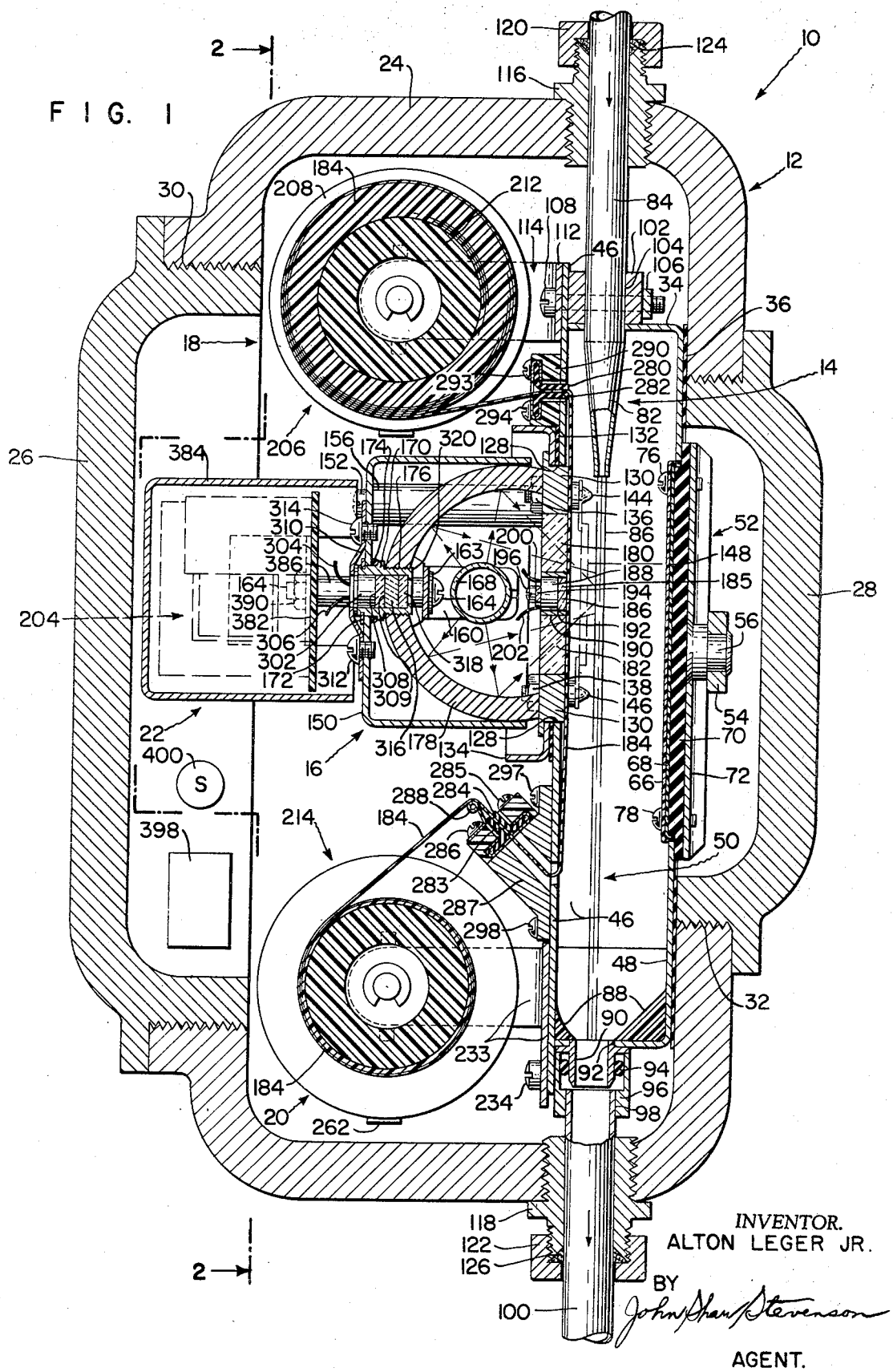
FIG. 1 is a cross-sectional view of the measuring apparatus taken along the line 1—1 of FIG. 2.

The measuring apparatus shown in FIG. 1 is comprised of a casing 12, a means 14 for passing a thin stream of fluid containing varying quantities of a fluorescent material such as oil through an internal portion of the casing 12, an ultraviolet light emitting and visible light detecting means 16, tape transport units 18, 20 to prevent oil film, dirt and other foreign matter in the stream of fluid from adhering to the means 16 and an electric ratio measuring circuit 22 associated with the detecting portion of the means 16 to electrically measure the quantity of the fluorescent material for example oil in the fluid stream.

The casing 12 is comprised of a hollowed-out rectangularly-shaped body portion 24 and removable end covers 26, 28 that are respectively shown threadedly connected at 30, 32 to the body portion 24.

Figure 2:
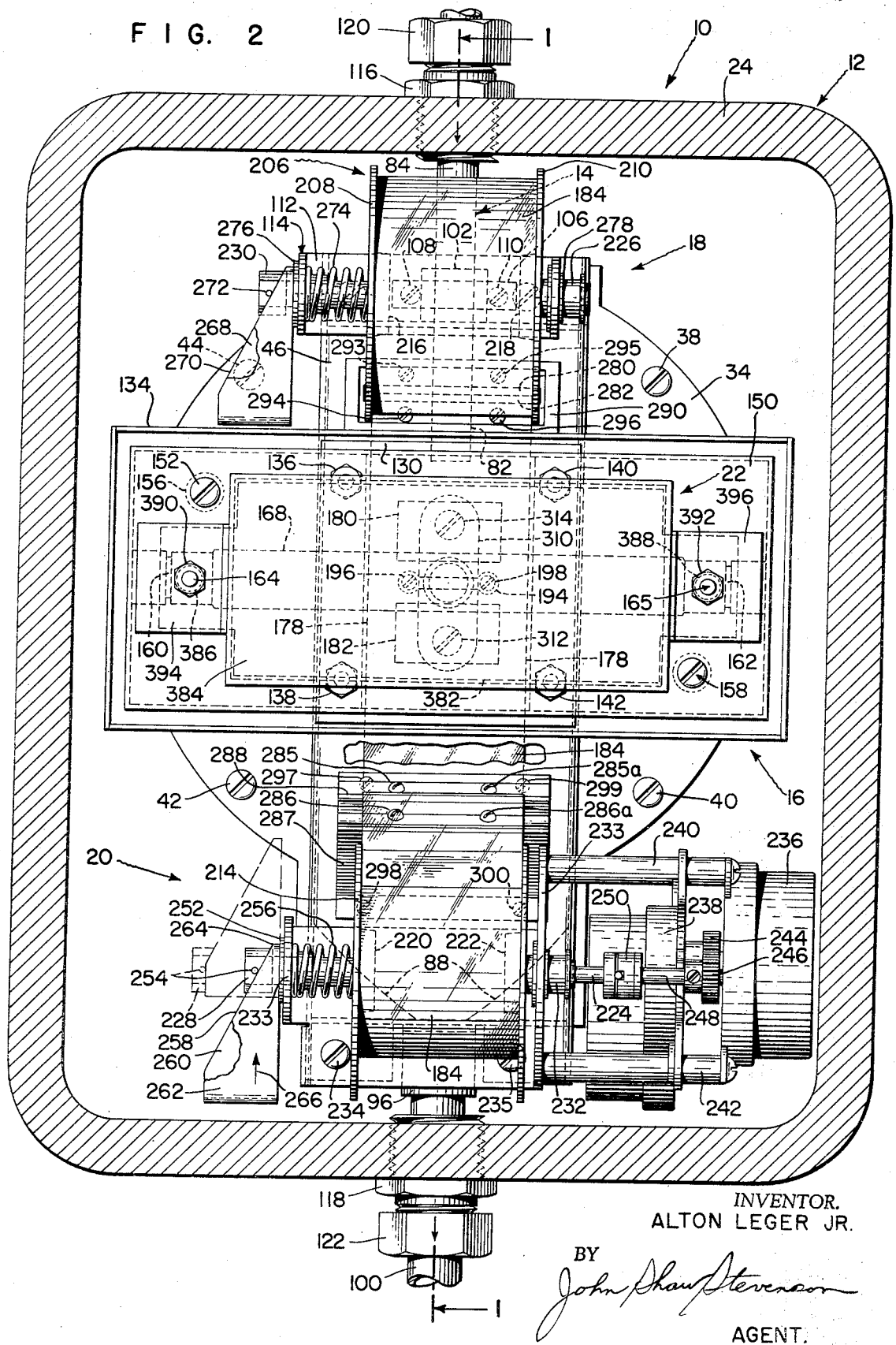
FIG. 2 is a view taken along line 2—2 of FIG. 1.
Figure 3:
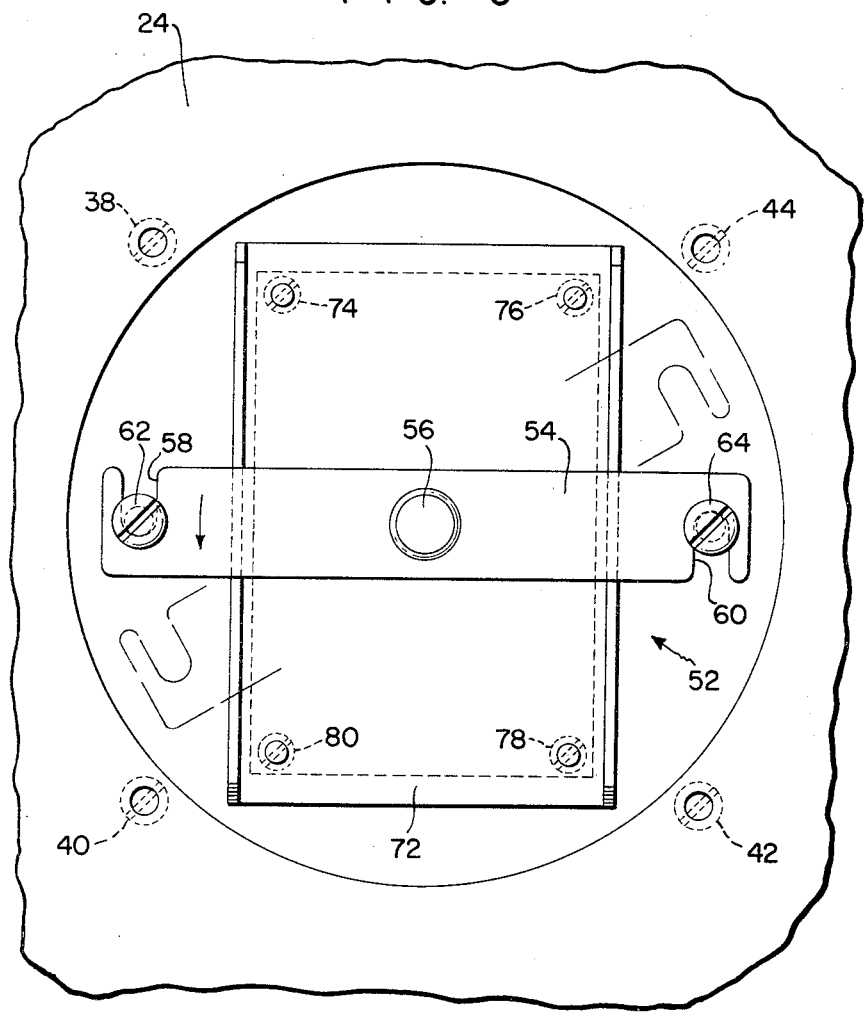
FIG. 3 shows a light-tight door for the measuring apparatus of FIGS. 1 and 2.

A U-shaped support plate 34 and seal 36 are attached to the right side of the casing 12 by means of four screw connections 38, 40, 42, 44 as shown in FIGS. 1 and 2. A second U-shaped support plate 46 is made integral by welding it with welding material 48 to the first support plate 34 to form a sampling chamber 50. A light-tight door 52 is employed as shown in FIGS. 1 and 3. This door 52 has a lever 54 pivoted thereon to rotate about a stub shaft 56 that is fixedly attached to and protrudes from the door 52. Separate hooks 58–60 are formed in each end of the lever 54 so that they may be brought into engagement as shown in FIG. 3 with the associated screws 62, 64 that are mounted on the support plate 34.

The door 52 is constructed of a layer of plastic 66, a sheet of commercially available Teflon 68 a layer of rubber 70 and a stainless steel plate 72 held together by screws 74, 76, 78, 80. When the screws 62 and 64 are tightened against their respective ends of the lever 54, they will maintain the lever 54, the stub shaft 56, and the door 52 and light-tight engagement with the support plate 34.

A nozzle 82 formed by partial compression of the ends of a deformable tube 84 as shown in FIG. 1 is the means 14 employed for introducing a thin stream of fluid 86 into the chamber 50. The upper end of the tube 84 is connected to any type of means not shown that will cause the fluid 86 under measurement to flow into and through the nozzle 82 for example a pump connected to a water filled oil compartment in an oil tanker or from any other fluid containing fluorescent material being used for example by a process industry.

The fluid 86 is shown in FIG. 1 flowing in a downward direction by the jet force behind it and/or gravity acting thereon through the chamber 50 and to the funnel shaped rubber base portion 88 into and through a drain 90 that is welded by means of welding material 92 to the lower portion of the support plate 34 forming a portion of the light-restricting chamber 50. A flexible O-shaped ring 94 is employed between the outer wall of the drain 90 and a gland 96 to from a fluid-tight seal. The gland is in turn connected by suitable braising material 98 to the end of a drain tube 100 through which the fluid is passed out of the measuring apparatus.

The inlet 84 has a holder 102 connected thereto by braising material 104. A flat left side of the holder 102 as shown in FIG. 1 contacts the support plate 46 and its right flat side contacts a rectangular-shaped holder retainer plate 106 shown in FIGS. 1 and 2.

A pair of spaced apart screws 108, 110 which pass through the base portion 112 of a U-shaped supply reel support plate 114 support plate 46 along the side of the holder 102 are threadedly connected to the retainer plate 106 to maintain it in a fixed support position on support plate 46.

The fluid inlet tube 84 and outlet tube 100 are each supported in the casing 12 by means of a similar threaded plugs 116, 118 and separately associated threaded members 120, 122 mounted on the plugs to retain their associated resilient seals 124, 126 in light fluid-tight explosion-proof engagement with their respective tubes 84, 100.

The stationary support plate 46 that forms the portion of the sampling chamber 50 has a wall portion 128 that forms a rectangular-shaped aperture in the plate 46 in which there is inserted an aluminum filter holder 130.

The filter holder 130 presses the seal 132 at the base of the ultraviolet light cover 134, to be hereinafter described into light-tight engagement against the left side surface of the support plate 46 by means of four stud connections 136, 138, 140, 142.

The right ends for example 144, 146 of all the stud connection 136–142 are constructed of a conical-shaped configuration to accommodate the mounting of a fluorescing reference glass 148 thereon as shown in phantom line form to simulate a fluorescing fluid sample such as an oily water when it is desired to calibrate the measuring apparatus in the absence of the fluid 86 under measurement.

The visible light emitting and visible light detecting means 16 is comprised of a light casing 150 mounted in fixed relation on the support plate 46 by means of two screw connecting members 152, 154 that are mounted in the opposite ends of spacer 156. Another dual screw and spacer connection 158 similar to and for the same purpose as that just described is also shown in FIG. 2 of the drawing.

Angle-shaped support brackets 160, 162 are respectively shown on opposite inner end portions of the lamp casing 150 by means of suitable screw and washer connections such as the screw and washer connections 163, 164, shown in FIG. 1, and a similar screw connection 165 shown in FIG. 2. The ultraviolet light source 168 extends between and is supported in the brackets 160, 162. A central portion of the lamp casing 150 has a cylindrical member 170 mounted thereon by means of a retainer ring 172 and a resilient O-shaped reflector biasing means 174. The right end of the member 170 is threadedly connected at 176 to an arcuate-shaped reflector 178.

The ultraviolet light source 168 emits its energy in many different directions. The light energy that is reflected from the inside surface of the reflector is, as illustrated by the arrows in FIG. 1, reflected from this surface and directed through either filter 180 or the filter 182 retained by the filter holder 130. These filters 180, 182 allow all the visible light to be removed and ultraviolet to be directed by way of a non-fluorescing transparent tape 184 made of for example a commercially available material trade-named Teflon onto the stream of fluid 86 under measurement. The particles of the fluorescent material that are carried by the stream of fluid 86 will be excited by the ultraviolet light and will cause these particles to direct emitted visible radiation through the transparent tape and a glass 185 coated with an ultraviolet absorbing filter 186. This filter 186 is in the form of a clear coating of a substituted benzotriazole material. This emitted visible radiation is thence directed into a photoelectric detector 188 which is preferably made of a photoelectric conductive material.

Figure 4:
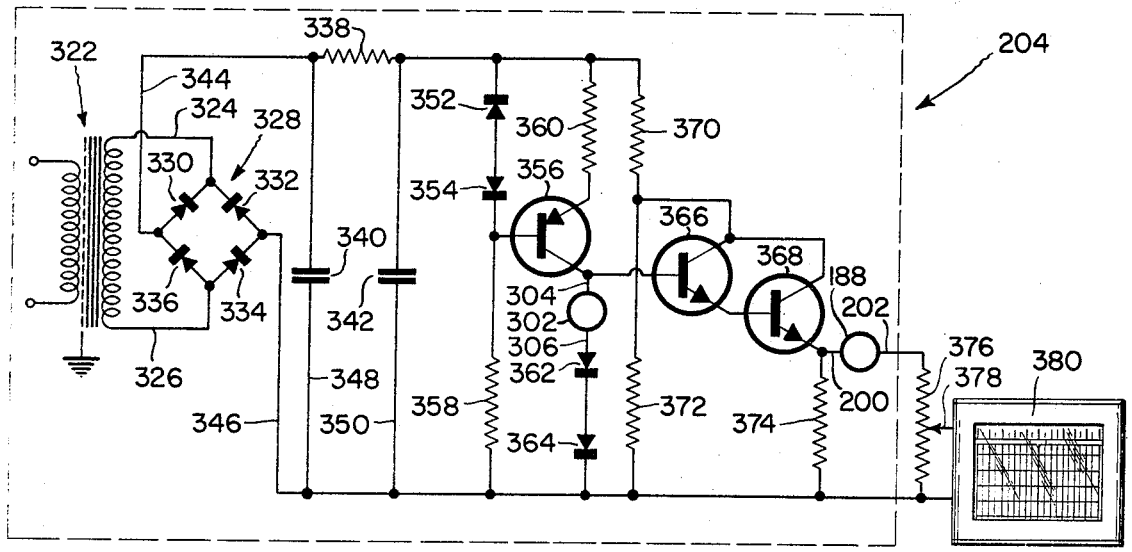
FIG. 4 shows an electric ratio measuring circuit that is associated with the detectors shown in FIG. 1.

Another sleeve 190 and an emitter light retaining member of silicon rubber 192 that is commercially available at RTV, seals components parts 185–188. The plastic strap 194 in the form of a commercially available resilient plastic that extends across the left end of the detector 188 and together with a pair of screws 196, 198 retains the detector 188 firmly in the sleeve 190, and member 192. A conductive pair of electrical leads 200, 202 are shown extending out of the detector 188 and are connected in an electrical measuring circuit 204 as shown in FIG. 4.

The tape transport units 18 and 20 are comprised of a supply spool 206 containing integral flange 208, 210 and drum portion 212 and a similar take-up spool 214. The sides of each of these spools 206, 214 contains slots 216, 218, 220, 222 therein to accommodate the insertion of the ends of the shafts 224, 226, 228, 230. The shaft 224 is mounted for rotation in the bearing 232 of a member that forms a U-shaped spool support plate and motor support bracket 233. A slow speed motor 236 and a fast speed motor 238 are mounted on the support bracket 233 by means of tie bolt connections 240, 242. The rotary motion of the respective high and low speed motors 236, 238 are connected to the spool shaft 230 by means of the associated gears 244, 246 output shaft 248 and a coupling 250.

The two motors 236, 238, each containing a one way clutch, are connected so that the slow motor 236 is energized during normal operation and driving shafts 248, 230. When faster movement of the take-up reel 214 is required, the faster drive motor 238 is energized and over drives the speed at which the output shafts 248, 224 are being driven by the slower motor 236.

The left end of shaft 224 is keyed at 222 to spool 214 to move it in a counterclockwise direction to reel portions of the tape 184 from supply spool 208 thereon while the reel is rotated about the stub shaft 228.

The stub shaft 228 is mounted on bearings 252 in the left end of support bracket 233, corrected by screw connections 234, 235 to support plate 46, and has a pin 254 protruding through both sides of its flat left end. The pin 254 is shown being biased by a spool release spring 256 against two wedged surfaces 258, 260 that form a substantially U-shaped plate 262. The open upper ends of the plate 262 are bent at 264 towards one another and retain it on the stub shaft 228.

By depressing the lower closed end of the wedged shaped plate 262 in the direction of the arrow 266, the plate 262 and the pin 254 and stub shaft 228 will be moved to their dotted line positions shown in FIG. 2 where removal of the spool 214 can then be affected.

A similar wedged shaped member 268, 270, pin 272 and spring 247 and bearings 276, 278 are shown employed for the supply spool 206 so that it can also be removed from the casing 12 similar to the take-up spools previously described.

When the motor drive take-up spool is driven in a counterclockwise direction as shown in FIG. 1 the transparent nonfluorescent tape 184 will be pulled from the supply spool 208 through a first pair of moisture removing wipers 280, 282 made of moisture blocking resilient material, over the glass filter 184, 186 through a second pair of resilient moisture blocking wipers 283, 284, supported by screws 285, 285a, 286, 286a on housing 287 over a rounded plate 288 and thence onto the take-up spool 214. Each of the housings 290, 287 which support the moisture blocking pairs of wipers 280, 282; 283, 284 are mounted by means of screw connections 293, 294, 295, 296, 297, 298, 299, 300 on the light-tight chamber plate 46.

Since the springs 274, 256 and the wipers 280, 282, each place a drag on the transparent tape when it is moved between the supply spool 208 and the take-up spool 214 it can be seen that a clean tape will be available for movement in snug physical surface to surface contact with the filter 184, 186 to continuously carry away any particles that would otherwise accumulate on the filter during a measurement of the quantity of fluorescent material in the stream 86.

MEASURING CIRCUIT

The electronic ratio measuring system 22 is comprised of not only the photoelectric detector 188, but also the photoelectric detector 302 which contains the electric leads 304, 306 as shown in FIGS. 1 and 4.

FIG. 1 shows the right end of the detector 302 retained in light-tight surface to surface engagement with a glass 308 coated with an ultraviolet light absorbing filter 309 that is of the same substituted benzotriazole material as the glass coated filter 185, 186 by means of a plastic strip 310 and two screw connections 312, 314.

The filters 308, 309 in turn are in physical light sealing contact with a referenced standard fluorescent material 316 which in turn is in physical light sealing contact with another visible light absorbing filter 318 which in turn is compressed into contact with the lip 320 on the member 170. The filter 318 performs the same function as that performed by the filter 180, 182.

When ultraviolet light from light source 168 passes through the filter 318 the filter 318 will absorb the visible light and will allow the ultraviolet to be passed into the standard fluorescent material 316 to excite this fluorescent material and cause it to direct its emitted visible rays through the glass coated ultraviolet light eliminating filter 308, 309 into the photoelectric detector 302.

The measuring apparatus 204 shown in FIG. 4 has a transformer 322 connected by leads 324, 326 to a rectifier 328 containing four diodes 330, 332, 334, 336 and a resistance 338, two capacitors 342 associated therewith that form an A.C. eliminating filter and which are interconnected by leads 344, 346, 348, 352 to the bridge 328.

The measuring circuit 204 is shown having a Zener diode 352, and an associated temperature compensating diode 354, a transistor 356 and resistors 358, 360 which provide a constant current supply for the photoelectric detector 188.

Another pair of diodes 362, 364 are interconnected as shown in FIG. 4 to correct for emitter base voltage drop and ambient and other temperature effects of two transistors 366, 368 forming a unitary gain amplifier to prevent output signal loss due to loading of the reference photoelectric detector 302.

The resistors 370, 372, 374 are employed as biasing resistances for the amplifiers 366, 368. The resistors 376 is the output resistor. This resistor 376 and a wiper 378 form a span adjustment for the potentiometric recording instrument 380. The measuring circuit 204 is effective to maintain the current output of the first detector 188 proportion to the amount of visible light it receives divided by the amount of light the referenced detector 302 receives.

It is important to note that the quantity of the output current signal resulting from this division of the current received by the respective detectors 188, 302 will always be proportional to the amount of fluorescent material in the fluid 86 under measurement. Furthermore, when electrical disturbances are introduced into the aforementioned measuring circuit due to changes in line voltage, aging, temperature and spectral shifts taking place in the radiant energy emitting means 168 and changes that occur due to the temperature coefficient of the photoelectric detectors the magnitude of output signal will be uneffected by these changes.

The aforementioned ratio circuit will produce an output current proportional to the amount of fluorescent material in the stream 86, but independent of certain system disturbances. This operation can be better understood by considering the effect of a typical disturbance encountered by this circuit. Assume, for example, that the output of lamp 168 is suddenly decreased due to a drop in line supply voltage. The output current would tend to decrease because less ultraviolet energy reaches the stream 86, less vissible light is emitted and the resistance of the photoelectric detector 188 is increased. Simultaneously, however, the visible light output of the standard fluorescent material 316 decreases, the resistance of the photoelectric detector 302 increases, and the voltage across the photoelectric detector 302 increases. The increases in this voltage just offsets the increase in the resistance of the photoelectric detector 188 so that the output current is maintained constant. The output current of this ratioing circuit will thus always be maintained proportional to the amount of fluorescent material in the sample and is independent of the aforementioned loop variation.

All the electrical components except the photoelectric detectors 188, 302 that forms the measuring circuit 204 shown in FIG. 4, are mounted on the printed circuit board 382 shown in FIG. 1 and FIG. 2. A casing 384 surrounds the circuit 204 and is maintained in fixed space relation from the top of the casing 150 by means of sleeves 386, 388 surrounding previously mentioned associated screw conections 164, 165 and nut members 390, 392 associated with each of these connections. The nut 390, and 392 are shown in FIGS. 1 and 2 retaining L-shaped brackets 394, 396 that maintain the end of the casing in snug contact with the printed circuit board 382.

Figure 5:
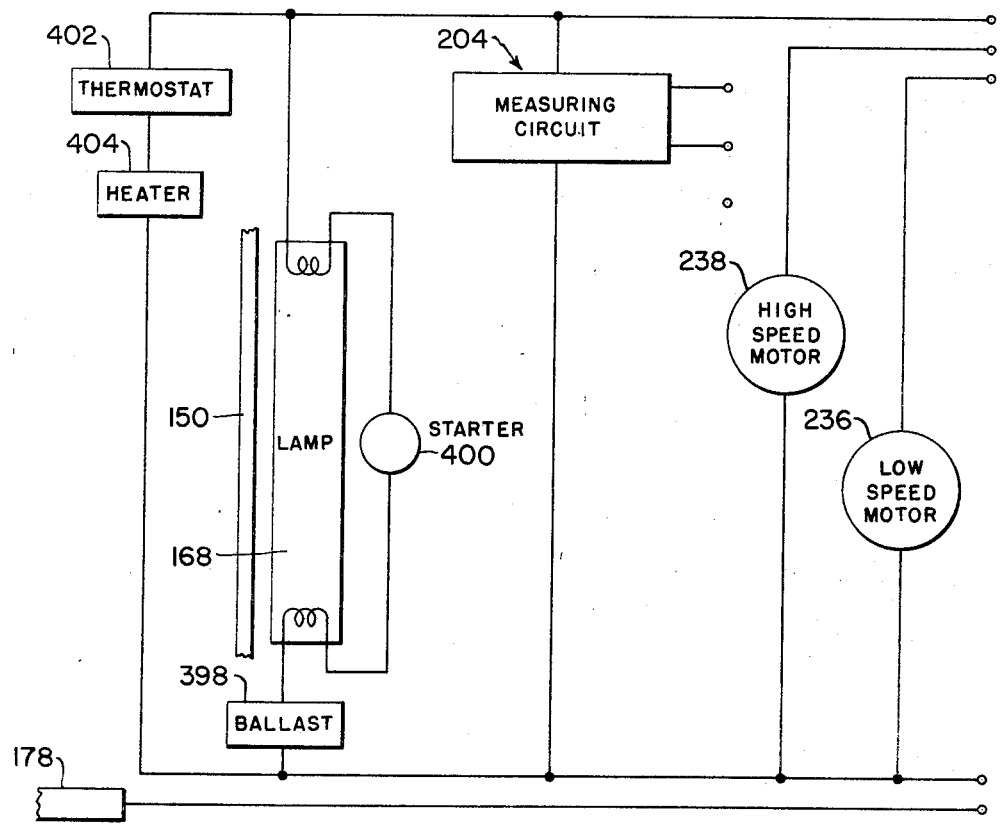
FIG. 5 shows an electrical circuit for high and low speed motors that are employed to selectively drive the spool carrying transparent tapes between the supply spool and the tape-up spool shown in FIGS. 1 and 2.

The only purpose in showing FIG. 5 is to disclose how the high-speed gear motor 238, the low speed motor 236, the radiant energy lamp source 168 having a ballast 398, and starter 400, and a thermostat 402, and heater 404, are connected in with the same power line as measuring circuit 204 previously described. In extremely cold operating ambient temperatures, the thermostat 402 and heater unit 404 are employed to maintain the temperature within the casing 12 at a sufficiently high temperature to assure initial lighting of the lamp source.

The embodiments of the invention in which an exclusive property or privilege is claimed are defined as follows:

1. A unitary apparatus to measure the quality of fluorescent material in a flowing fluid stream, comprising a radiant energy emitting means to direct ultraviolet energy into the fluid and also into a stable reference fluorescent material, a first photoelectric detector means responsive to visible light rays emitted by the flourescent material in the fluid, a second photoelectric detector means having the same visible light ray responsive characteristics of the first detector means and being responsive to visible light rays emitted by said reference material, said second detector means being operable to produce a continuous reference voltage proportionaly to the intensity of the stable reference fluorescent material, an electric circuit operably connected to continuously apply said reference voltage to the first mentioned detector to produce an output current that is directly proportional to the quantity of fluorescing material in said flowing stream and a meter operably connected with the output current produced by the electric circuit to thereby continuously provide an accurate measurement of the quantity of the fluorescent material occurring in said flowing fluid stream.

2. The apparatus as defined in claim 1 wherein the photoelectric cells are constructed of a photoconductive material, the reference material is constructed of a fluorescing glass, the reference voltage produced by the second detector means in response to the visible light rays emitted by the fluorescing glass is a reference voltage that is inversely proportional to the intensity of the fluorescence produced by the fluorescing glass.

3. The apparatus as defined in claim 1 wherein the electric circuit is comprised of a power supply, a pair of diodes one of which is a Zener diode, a transistor, and resistances operably connected to pass constant current through said second photoelectric conductor, a unity gain amplifier comprising a pair of transistors and a pair of diodes in series with the second photoelectric conductor to compensate for the emitter base voltage drops of the amplifier, said unity gain amplifier being electrically connected between the output of the second photoelectric conductor and the input of the first photoelectric conductor to maintain the current output of said first photoelectric conductor proportional to the amount of visible light received by said first photoelectric conductor divided by the amount of light received by said second photoelectric conductor the division of which is proportional to the amount of fluorescent material in the fluid and wherein said electric circuit is operable to produce a current resulting from said division that is uneffected by errors due to changes in line voltage, aging, temperature and spectral shifts of the radiant energy emitting means and changes due to the temperature coefficient of the photoelectric conductors.

4. The apparatus as defined in claim 1 wherein each of the photoelectric detector means is constructed of photoconductive material and an ultraviolet filter containing a clear coating of a substituted benzothiazole on one surface thereof to filter out said ultraviolet and to allow said visible light to pass therethrough.

5. The apparatus as defined in claim 1 wherein each of the photoelectric detectors is constructed of photoconductive material having substantially the same temperature coefficient.

6. The apparatus as defined in claim 1 wherein a light-tight chamber is formed adjacent the first photoelectric detector, the fluid is passed through the chamber and in spaced relation therefrom when a fluorescent measurement of the fluid is being effected and wherein a glass simulating a fluorescent material is substituted for the fluid in the chamber when it is desired to calibrate the apparatus in the absence of the fluid.

7. The apparatus as defined in claim 1 wherein the ultraviolet energy emitting means is comprised of an ultraviolet source located within a concave-shaped reflector and wherein a first member is positioned across the front opened end of the reflector to filter out visible light and to pass ultraviolet energy from said source that is reflected from said reflector into said fluid under measurement, the first and second photoelectric detector means being constructed of a photoconductive material, the first photoconductor being positioned within a wall forming an aperture in the first member, a second member mounted on the stream side of the photoconductive material to filter out the ultraviolet energy reflected from the fluid, the second detector means being positioned within a wall forming an aperture in the reflector and comprising a third member to filter out visible light, a reference fluorescent material, and a fourth member to filter out the ultraviolet energy passing through the reference material mounted in series on the ultraviolet source side of the detector means.

8. The apparatus as defined in claim 1 wherein a continuously movable non-fluorescent transparent web is positioned in spaced relationship between the first photoelectric detector means and the fluid stream under measurement to transmit said ultraviolet light rays therethrough to fluores the fluorescent material in the stream and said transparent web providing a means of passing said light emitted from said fluorescent fluid stream to said first mentioned detector.

9. The apparatus as defined in claim 1 wherein a means is positioned to send a relatively narrow jet of the fluid to be measured in a direction that is adjacent to and in spaced relationship with the first photoelectric detector means.

10. The apparatus as defined in claim 1 wherein an elongated non-fluorescent transparent web is positioned in spaced relation between the first photoelectric detector and the fluid under measurement and a transport means is employed to move successive portions of the tape at different speeds between the first detector and said fluid.

References Cited

UNITED STATES PATENTS

| | | | |
|---|---|---|---|
| 2,907,704 | 10/1959 | Trump. | |
| 2,999,819 | 9/1961 | Blair | 250— 71 X |
| 3,151,204 | 9/1964 | Stacy | 250—71 |
| 3,121,790 | 2/1964 | Munday et al. | 250—43.5 |

OTHER REFERENCES

"Method for Analyzing Fluorocarbon Compositions" Haendler et al., Mar. 14, 1950.

RALPH G. NILSON, Primary Examiner

C. E. CHURCH, Assistant Examiner